United States Patent
Hadi Salim et al.

(10) Patent No.: US 6,535,482 B1
(45) Date of Patent: Mar. 18, 2003

(54) CONGESTION NOTIFICATION FROM ROUTER

(75) Inventors: Jamal Hadi Salim, Nepean (CA); Biswajit Nandy, Ottawa (CA); Nabil Seddigh, Ottawa (CA); Joseph Fook-Kong Thoo, Saratoga, CA (US)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/306,421

(22) Filed: May 6, 1999

(30) Foreign Application Priority Data

May 8, 1998 (CA) .............................................. 2237208

(51) Int. Cl.[7] .............................................. G01R 31/08
(52) U.S. Cl. ...................................... 370/229; 370/236
(58) Field of Search .............................. 370/229, 230, 370/231, 232, 233, 234, 235, 236, 252, 253, 356, 359, 395, 412, 413, 415, 417, 419, 428; 709/235, 249

(56) References Cited

U.S. PATENT DOCUMENTS

| | | | |
|---|---|---|---|
| 5,313,454 A | | 5/1994 | Bustini et al. |
| 5,377,327 A | | 12/1994 | Jain et al. ................. 395/200 |
| 5,689,550 A | * | 11/1997 | Garson et al. ........... 379/88.18 |
| 5,694,390 A | * | 12/1997 | Yamato et al. ............... 370/352 |
| 5,699,345 A | * | 12/1997 | Watanuki et al. ............ 370/230 |
| 5,719,853 A | * | 2/1998 | Ikeda ........................ 370/229 |
| 5,734,865 A | * | 3/1998 | Yu ............................. 370/232 |
| 5,748,901 A | * | 5/1998 | Afek et al. ................. 709/250 |
| 5,889,761 A | * | 3/1999 | Yamato ..................... 709/238 |
| 5,940,375 A | * | 8/1999 | Soumiya et al. ............ 370/231 |
| 6,118,761 A | * | 9/2000 | Kalkunte et al. ........... 370/229 |
| 6,208,653 B1 | * | 3/2001 | Ogawa et al. .............. 370/249 |
| 6,222,839 B1 | * | 4/2001 | Nakazaki et al. ........... 370/395 |
| 6,233,248 B1 | * | 5/2001 | Sautter et al. .............. 370/465 |
| 6,252,851 B1 | * | 6/2001 | Siu et al. ................... 370/236 |

OTHER PUBLICATIONS

Sally Floyd, "TCP and Explict Congestion Notification".

* cited by examiner

*Primary Examiner*—Douglas Olms
*Assistant Examiner*—Phirin Sam
(74) *Attorney, Agent, or Firm*—Foley & Lardner

(57) ABSTRACT

In a router in a network comprising a source node, and a receiver node, and other nodes, a congestion monitor determines a degree of congestion, which is sent back to the source node, using an OSI network layer protocol. This enables the flow of packets from the source to be controlled more accurately to maintain high throughput with reduced probability of congestion. Using the network layer rather than lower layers can ensure the indication can be carried across the entire network, and not be lost at boundaries between data links making up the network.

21 Claims, 12 Drawing Sheets

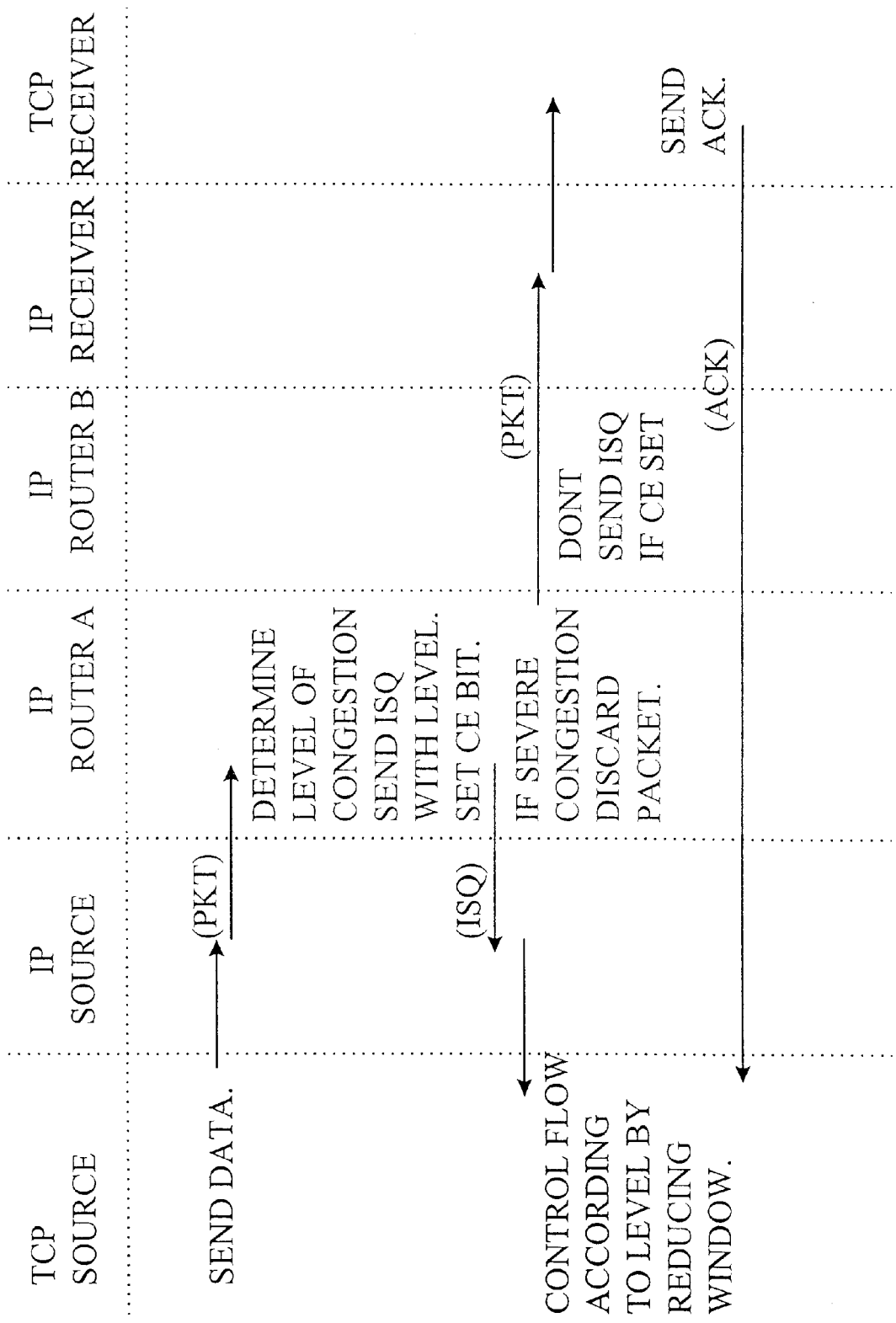

CONGESTION NOTIFICATION FROM ROUTER

RELATED APPLICATIONS

This application is related to U.S. patent application Ser. No. 09/306,414 entitled RECEIVER BASED CONGESTION CONTROL filed concurrently herewith, and hereby incorporated by reference.

BACKGROUND TO THE INVENTION

1. Field of the Invention

The invention relates to packet routing apparatus for routing packets in a network, to source apparatus for use in a packet network, to methods of processing packets in a network, 2. Background Art Congestion in packet networks may occur for example at routers where flows converge from different sources. As complicated networks may consist of numerous different end systems (sources and receivers), routers, and links, it is usually impossible to match their capacities perfectly. Accordingly, congestion will occur where more packets are received than can be handled. Various ways of handling congestion are known. At the simplest level, buffering is provided to handle temporary overloads. For longer overloads, flow control mechanisms are provided, to enable downstream elements to cause the source to reduce the rate of sending packets.

If a buffer overflows before the source reduces the flow, then packets will be discarded. The source may eventually detect that these packets have not been acknowledged, and retransmit them. This can make the congestion worse, and lead to complete collapse of the network. On the other hand, if the flow control is made too strong to avoid such a collapse, the throughput of the network may be very low, thus making inefficient use of resources.

Other mechanisms to improve efficiency include admission control, preallocation of buffers, and delay sensitive routing, to avoid congested regions.

Flow control relies on some sort of notification of congestion. This may be implicit or explicit. Congestion can be inferred for example from detecting at the source that packets have been discarded downstream, or detecting delays in the time taken for a packet to arrive. However, with such methods there may be a considerable lag between the congestion occurring, and it being detected. Also, it is possible that the packets were discarded or delayed for reasons other than congestion, e.g. link failure, or erroneous routing. Accordingly, explicit congestion notification mechanisms have been used. One method is described in U.S. Pat. No. 5,377,327 (Jain et al) in the context of a system in which at intermediate nodes, a flow is allocated a share of the capacity. If the allocation is exceeded, a flag is set in each packet. The flags may be counted and if the proportion of packets with the flag set exceeds a threshold, then the flow from the source is adjusted.

Another example is in Frame Relay, a data link layer protocol which has both forward explicit congestion notification (FECN) for notifying the receiver, and backward explicit congestion notification for notifying the source directly. ATM also has an FECN mechanism. The Internet Protocols (IP) also include an FECN and a BECN mechanism. The BECN mechanism is in the form of an Internet Control Message Protocol (ICMP) message called the ICMP Source Quench (ISQ) message. However, it is currently recommended that this message not be used, as it may consume too much bandwidth, and thus contribute to the congestion, and is unfair and ineffective in determining which of multiple flows should be limited.

It has been proposed that ISQs be used in conjunction with random early detection (RED) routers, to enable the rate of sending ISQs to be limited, and reflect how much each flow is contributing to the congestion. However, this has not been adopted, and instead, current practice in TCP/IP (Transport Control Protocol/Internet Protocol) involves using TCP, a transport layer protocol, to determine either lost packets or increases in delays using a timeout mechanism, or determining increases in delays, by timing the acknowledgment sent back by the TCP receiver. This enables the TCP sender to infer congestion and react by reducing its window for that flow, that is, the number of packets it can send towards a given receiver before it must wait for acknowledgments from the receiver.

Floyd [Sig94 paper "TCP and Explicit Congestion Notification"] discloses a methodology for doing ECN for IP [and later in an IETF draft, November 1997]. Floyd suggests the use of RED gateways to detect incipient congestion before the queue overflows. The congestion causing packets are marked on their way to the receiver end system (from the sender end system), with a probability proportional to their bandwidth usage, using the CE (Congestion Experienced) bit in the IP header. When the receiver end system receives the congestion causing packet they inform the sender end system to slow down when ACKing that packet by setting the ECE (Explicit Congestion Echo) bit in the TCP header.

The use of ECN capable gateways for notifying end systems prevents unnecessary packet drops. In the ideal situation where everyone supports ECN at the end system as well as at the intermediate nodes, sources are now informed quickly and unambiguously that there is congestion in the network and therefore do not have to rely on extrapolating that condition. Floyd also suggests that with the use of tagging congestion-causing packets, other types of networks that the IP packet traverses e.g. ATM can employ their own congestion control algorithms as well as have the ability to mark congestion causing packets.

SUMMARY OF THE INVENTION

It is an object of the invention to provide improved methods and apparatus.

According to a first aspect of the invention there is provided a packet routing apparatus for routing packets in a network comprising a source node, and a receiver node, and other nodes, the routing apparatus comprising:

input means for receiving a packet passed across the network from the source node;

a congestion monitor for determining a degree of congestion at the routing apparatus; and output means coupled to the input means and to the congestion monitor, for sending an indication of this degree of congestion to the source node, using an OSI network layer protocol.

An advantage of sending an indication of the degree of congestion is that the flow of packets from the source can be controlled more accurately to maintain high throughput with reduced probability of congestion. An advantage of sending it straight back to the source rather than using the packet to carry the information on to the receiver then returned to the source, is the speed of response. The combination of speed and graded congestion information work together to enable the probability of severe congestion to be effectively reduced. An advantage of sending the indication at the network layer rather than higher layers is that the mechanism is not tied to any particular higher layer protocol. An advantage of sending at the network layer rather than lower layers is that it can ensure the indication can be carried across the entire network, and not be lost at boundaries between data links making up the network. Furthermore, as the receiver need not be involved in the congestion notification, there is no need for it to be ECN capable, and thus there is no need for a negotiation of ECN capability at flow set up time.

Preferably, the network layer protocol is an Internet Protocol.

Preferably the Internet Protocol used is the Internet Control Message Protocol Source Quench message.

Preferably the indication to the source is made proportional to how much the packets from the source contribute to the congestion, relative to packets from other nodes.

An advantage of this is that flow control fairness and effectiveness in preempting congestion can be improved, if the nodes sending most packets can be controlled to reduce their flow most, or first.

Preferably the routing apparatus further comprises an output rate adapter for making the indication proportional by adapting the rate of sending indications.

Preferably the routing apparatus further comprises a packet queue, the congestion monitor being arranged to operate according to how full is the packet queue.

An advantage of this is that it is easy to measure, and can enable queue overflow to be predicted and prevented.

Preferably the routing apparatus further comprises a packet marker means for marking the packet to indicate it has experienced congestion.

An advantage of this is that it can enable the receiver learn of congestion, and thus perhaps contribute towards solving it, e.g. by assisting in flow control. A further advantage of this is that it can improve compatibility with other nodes using different congestion notification methods. Furthermore, it enables subsequent nodes to suppress sending their congestion indications back to the source, if they know one has already been sent for that packet. This can reduce the bandwidth used by sending such indications, which would otherwise contribute to the congestion.

Preferably the routing apparatus further comprises means for determining from the packet, if it has previously triggered a sending, to the source node, of an indication of congestion, the output means being operable according to whether such an indication had been sent previously.

This can reduce the bandwidth used by sending such indications, which would otherwise contribute to the congestion.

Another aspect of the invention provides a source apparatus for use in a packet network comprising a plurality of nodes, the apparatus comprising:

output means for sending a packet via an intermediate one of the nodes in the network to a receiving one of the nodes;

input means for receiving from the intermediate one of the nodes an indication of a degree of congestion at that intermediate one, sent using an OSI network layer protocol, in response to the packet; and a controller for controlling a flow of further packets to the receiving node on the basis of the indication.

Another aspect of the invention provides a method of processing packets in a network comprising a receiver node, a source node and at least one intermediate routing node, the method comprising the steps of: at one of the intermediate routing nodes, receiving a packet passed across the network;

determining a degree of congestion at the routing node; and sending an indication of this degree of congestion to the source node, using an OSI network layer protocol.

Preferably the method further comprises the step of, at the source node:

receiving from the intermediate routing node the indication of the degree of congestion; and controlling a flow of further packets to the receiving node on the basis of the indication.

Another aspect of the invention provides a method of processing packets in a network comprising a receiver node, a source node and at least one intermediate routing node, the method comprising the steps of, at the source node:

sending a packet to the receiver node;

receiving from the intermediate routing node an indication of a degree of congestion at that intermediate routing node, sent using an OSI network layer protocol, in response to the packet; and controlling a flow of further packets to the receiving node on the basis of the indication.

Preferably the method further comprises the step of receiving from the receiver node a flow control message, the step of controlling the flow of further packets being made also on the basis of this flow control message.

Another aspect of the invention provides packet routing apparatus for routing packets in a network comprising a plurality of nodes, the routing apparatus comprising:

an input for receiving a packet passed across the network;

a congestion monitor for determining congestion in the routing apparatus;

a packet reader for determining from the packet, if it has previously triggered a sending, to the source node, of an indication of congestion at another of the intermediate routing nodes; and an output for sending an indication of congestion to the source node according to whether such an indication had been sent previously.

An advantage of making sending the indication to the source node dependent on whether one has been sent previously, is that any addition to the congestion by sending the indications, can be reduced. This is particularly desirable in instances where there is congestion at multiple nodes, in which case, sending multiple indications may be avoided.

Another aspect of the invention provides a method of processing packets in a network comprising a receiver node, a source node and at least one intermediate routing node, the method comprising the steps of, at one of the intermediate routing nodes:

receiving a packet passed across the network;

determining congestion in the routing apparatus;

determining from the packet, if it has previously triggered a sending, to the source node, of an indication of congestion at another of the intermediate routing nodes; and sending an indication of the congestion to the source node according to whether such an indication had been sent previously.

Preferably the packet is an Internet Protocol packet, and the step of determining from the packet, if it has previously triggered a sending of an indication comprising checking the Congestion Experienced bit in the packet header.

Preferably, the step of sending an indication is not carried out if the indication had been sent previously, unless the routing apparatus discards the packet.

Another aspect of the invention provides software stored on a computer readable medium for carrying out the above methods.

Any of the preferred features may be combined, and combined with any aspect of the invention, as would be apparent to a person skilled in the art. Other advantages will be apparent to a person skilled in the art, particularly in relation to prior art other than that mentioned above.

To show, by way of example, how to put the invention into practice, embodiments will now be described in more detail, with reference to the accompanying drawings.

BRIEF DESCRIPTION OF DRAWINGS

FIG. 4 shows in sequence chart form the actions of elements in a TCP/IP network corresponding to that shown in FIG. 1, according to an embodiment of the invention showing sending a congestion level in an ISQ;

DETAILED DESCRIPTION

Figure 1:
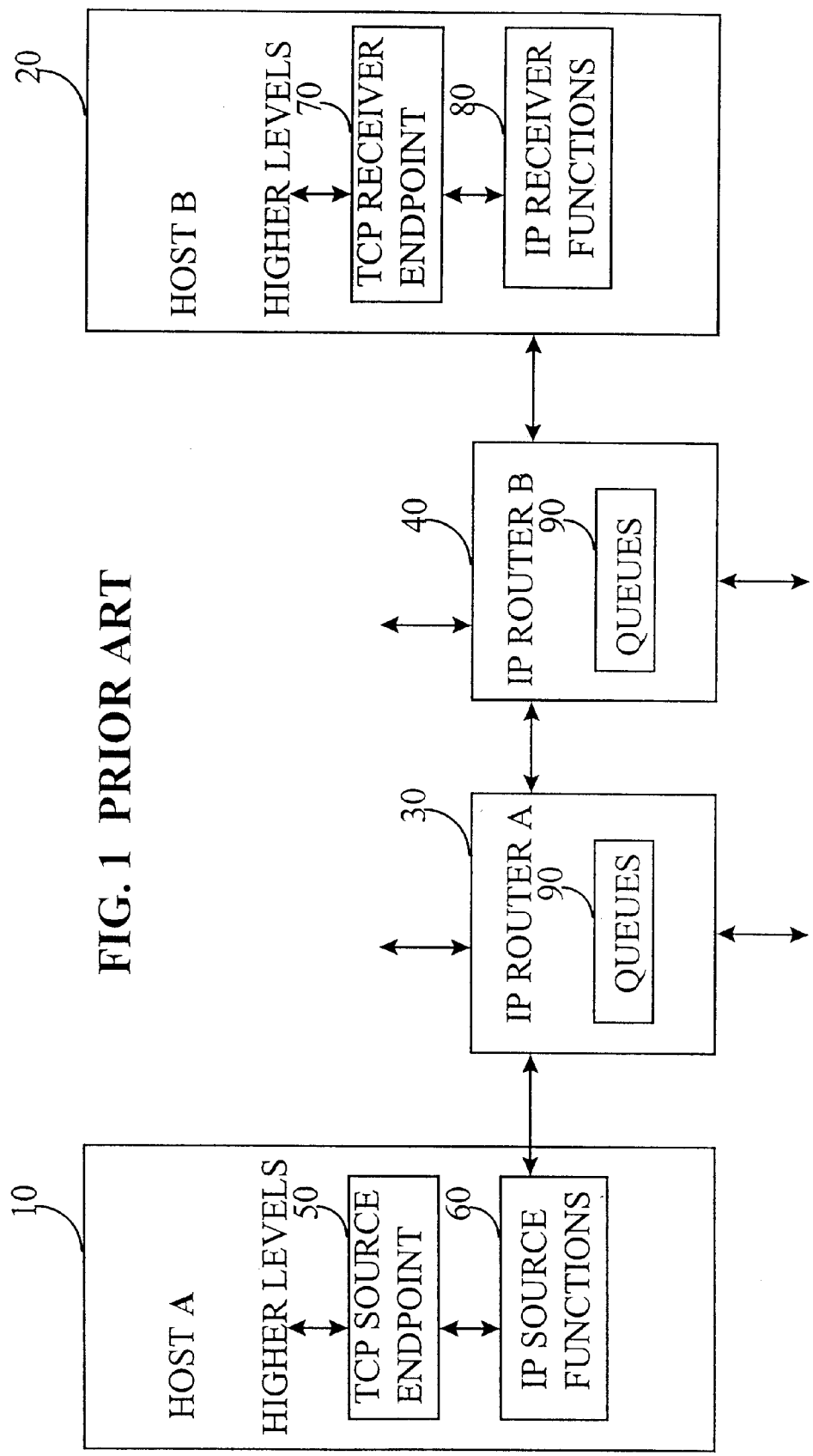
FIGS. 1 to 3 show known arrangements.
Figure 2:
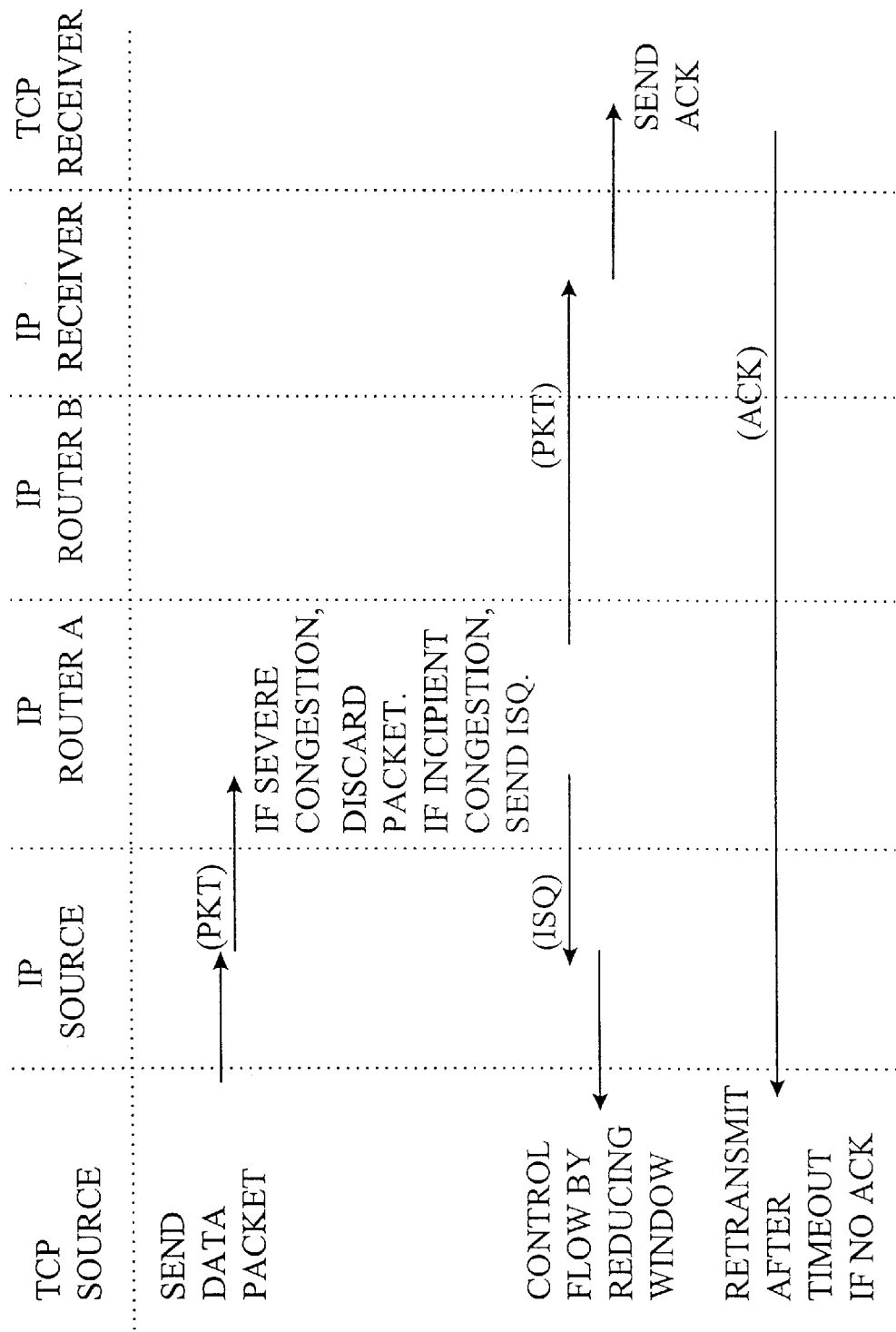
Figure 3:
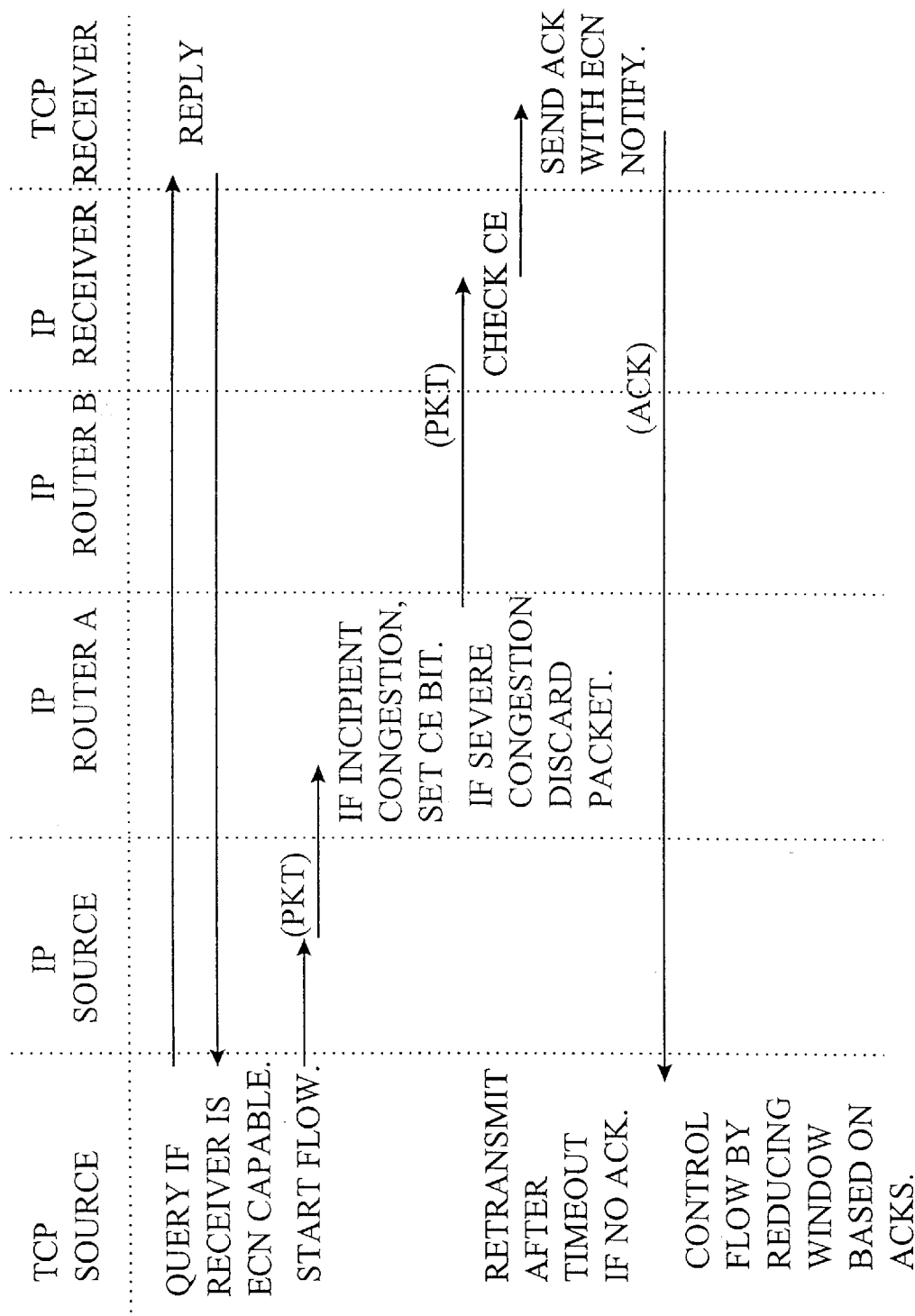

FIGS. 1–3, Prior Art

FIG. 1 shows in schematic form some of the principal elements in a network using TCP/IP. A host A, 10 is being used to send data to another host B,20, across an IP network. An application running on host A, or remotely, delivers the data to be transmitted to a TCP source endpoint, 50. This passes the data to IP source functions 60. The source functions send IP data packets to an IP router A,30. The packets are routed via another IP router B,40, and eventually reach the IP receiver functions 80 on host B. The IP receiver functions 80 demultiplex the IP packets and pass the data to the TCP receiver endpoint 70 in the host B. The TCP receiver transfers the data to higher level software in the host B.

As indicated by the vertical arrows to the IP routers A and B, 30 and 40, many other paths may converge at the routers. Queues 90 are provided, to handle transient congestion. In practice there may be many more than three hops between source and receiver. TCP/IP is shown as an example, but there are many other protocols for which a similar arrangement would apply, both in OSI layers 4 and 3 respectively, and in other layers.

FIG. 2 shows some of the principal actions of each of the elements of FIG. 1, for the proposal mentioned above that ISQ messages be used as a congestion notification system. The TCP source sends data via the IP source to router A. If there is severe congestion at router A, the packet may be discarded. If the router detects incipient congestion, an ISQ is sent back to the IP source. The IP source will interpret the ISQ and pass an indication up to the TCP source functions, notifying of the congestion at router A, on the flow to the TCP receiver at host B.

The TCP source functions react by reducing the window to control the flow. If the packet is not discarded by router A, it is forwarded on via router B to the IP receiver and ultimately to the TCP receiver. The TCP receiver sends an acknowledgement back to the TCP source.

FIG. 3 shows an example of the above-mentioned proposal by Floyd. Again the actions of the principal elements of FIG. 1 are shown. There may be an initial negotiation before flow starts, between the TCP source and the TCP receiver. The source may query if the TCP receiver is ECN capable. If the TCP receiver replies positively, e.g., by using the ECN notify bit (also called the ECN-ECHO bit) in the SYN packet or the SYN-ACK packet.

If both TCP source and TCP receiver are ECN capable, the TCP source instructs the IP source to set the ECT bit in the IP header of data packets for that flow. If the router A detects incipient congestion, it may either discard the packet, if the congestion is too severe, or, if less severe, it can mark the packet by setting the CE bit in the IP header. When a marked packet is received by the IP receiver, it will notify the TCP receiver of the congestion notification. The TCP receiver will then send an ACK with the ECN notify bit set. This is sent back to the TCP source, which reacts by reducing the window size to control the flow. The source does not respond to further ECN ACKs until the end of that window.

If no ACK is received for any reason, e.g., router A has discarded the packet, after a time-out, the TCP source retransmits the packet.

If a packet is received at the source with ECN-notify set in the TCP header then the source knows that there is network congestion and reacts by halving both the congestion window, cwnd and the slow start threshold value, ssthresh.

The source does not react to ECN more than once per window. Upon receipt of an ECN-notify packet at time t, it notes the packets that are outstanding at that time (sent but not yet acked, snd_una) and waits until a time u when they have all been acknowledged before reacting to a new ECN message. The sender does not increase the congestion window in response to an ACK if the ECN-notify bit is set. Incoming acks will still be used to clock out data if the congestion window allows it. TCP still follows existing algorithms for sending data packets in response to incoming ACKs, multiple duplicate ACKs or retransmit timeouts.

FIG. 4—Embodiment Using ISQ

FIG. 4 shows the actions of elements in a TCP/IP network corresponding to that shown in FIG. 1. The TCP source sends a data to the IP source, which sends it in the form of IP packets to router A. Router A determines the degree of congestion. It discards the packet if congestion is very severe, and sends an ISQ back to the IP source. For other levels of congestion, it sends an ISQ to the source indicating the level of congestion, and marks the packet by setting the CE bit, before passing it on to router B. Router B does the same except that if the packet was marked by a preceding router, it does not send a further ISQ, since the TCP source has already been alerted by the first ISQ. An exception is where the congestion is more severe in IP router B. For example, if the packet is discarded at IP router B, then sending an ISQ from router B to TCP source may be justified, to enable more drastic flow control to be implemented if desired.

The IP receiver, unlike the prior art case shown in FIG. 3, does not need to be ECN capable, since the ISQ notification is enough for flow control. Nevertheless, if the receiver is ECN capable, perhaps for compatibility, it would detect whether the CE bit and ECT bit are set in the IP header, and notify the TCP receiver of the congestion indicated by these bits. As in FIG. 3, the TCP receiver sends an ACK with the ECN notify bit set, back to the TCP source. This may or may not be used by the source, in addition to the notification from the ISQs. As will be discussed in more detail below, the TCP source will control the flow of packets by reducing its window, according to the level of congestion indicated in the ISQ. If it can also control the flow according to whether ACK packets received have their ECN notify bit set or not, it may be advantageous, for compatibility with intermediate router nodes which cannot send ISQs.

Figure 5A:
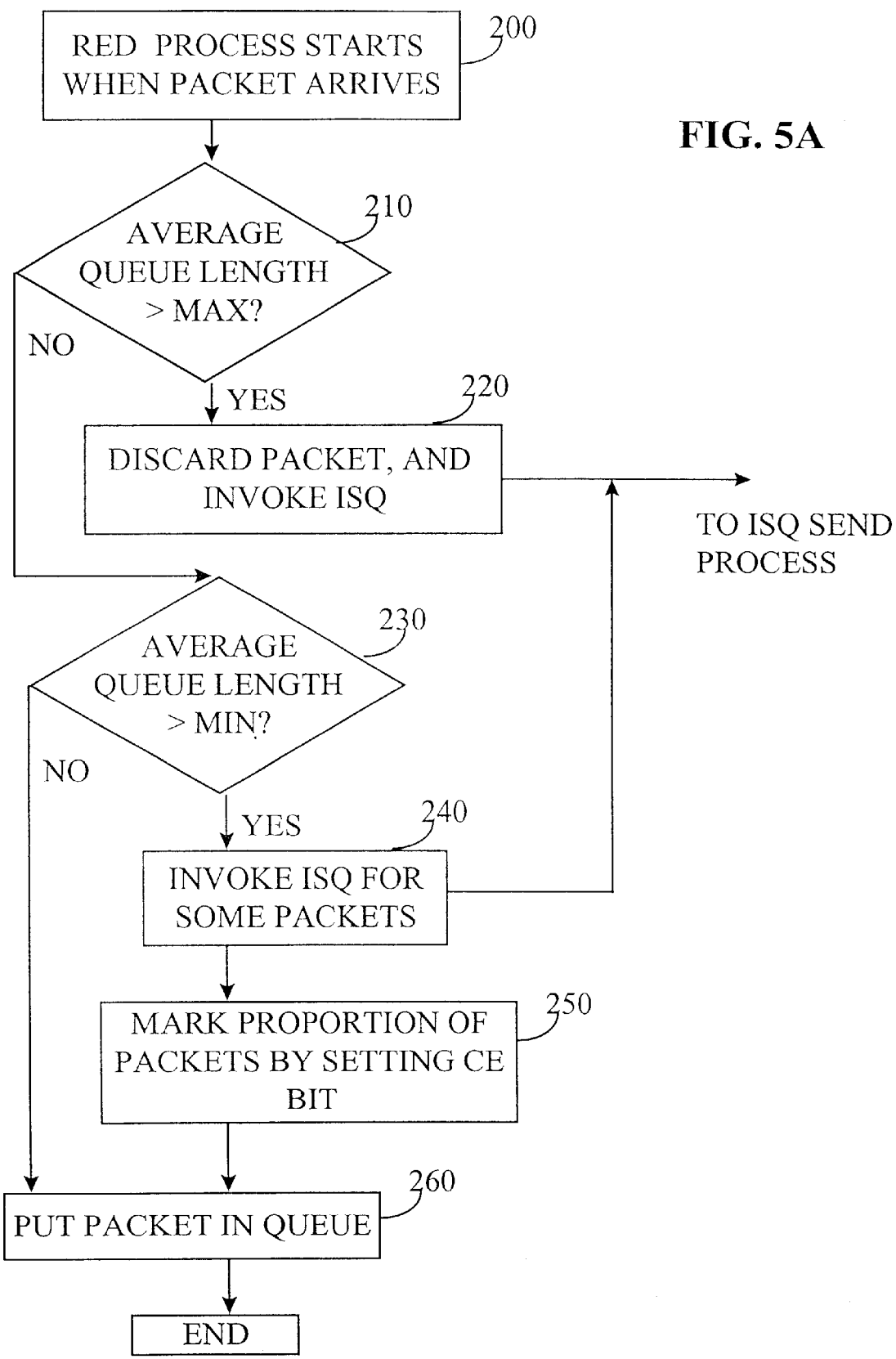
FIG. 5A shows parts of a RED process in a router carrying out the actions of FIG. 4.
Figure 5B:
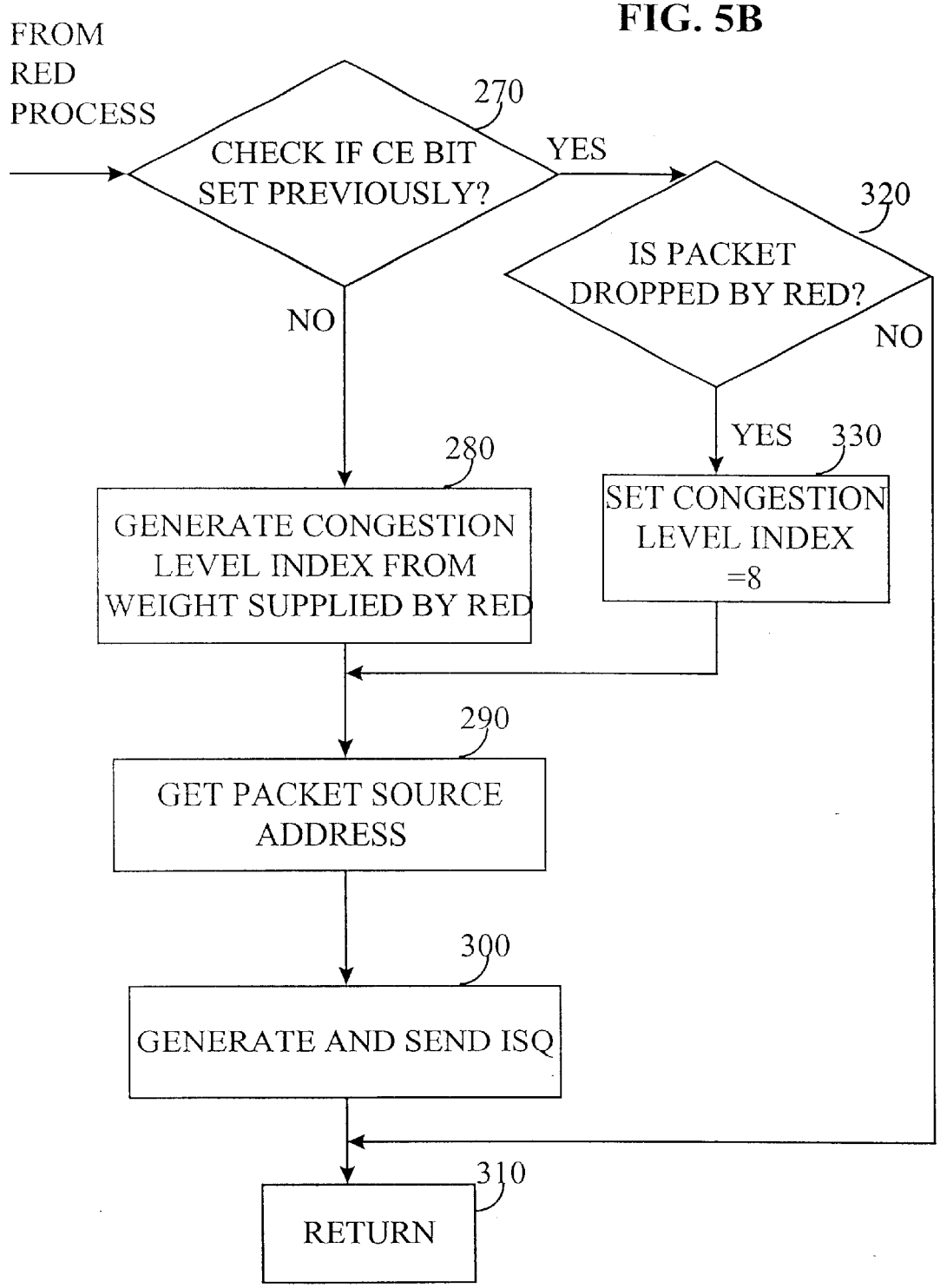
FIG. 5B shows parts of an ISQ send process in a router carrying out actions of FIG. 4.

FIGS. 5A,5B—Example of Router Actions of FIG. 4

FIGS. 5A and 5B show in more detail two processes happening inside the router in the embodiment of FIG. 4: Firstly a random early detection (RED) process, and secondly an ISQ sending process, which may be invoked by the RED process. The RED process is an example of a congestion monitor. It is known and well documented, and need not be described here in detail. It monitors average queue lengths using a low pass filter. Many other methods could be used. The ISQ is an example of a mechanism for sending an indication of this degree of congestion to the source node, using an OSI network layer protocol. Other mechanisms can be used for this and other protocols.

In the RED process, at 200, an incoming packet arrives. At 210 the process determines if the average queue length is greater than a predetermined maximum threshold. If so, the packet may be discarded and the ISQ sending process invoked.

Otherwise, at 230, it is determined if the average queue length is greater than a minimum threshold. If so, again, the ISQ sending process may be invoked, at 240, depending on whether the packet is chosen by the RED process for marking, 250. Only a proportion of packets are marked at this stage. The proportion is made dependent on the relative bandwidth used by each flow. This is designed to improve the fairness of the congestion notification, and make the overall flow control for many paths, more stable. This is one example of a mechanism for making the indication to the source proportional to how much the packets from the source contribute to the congestion, relative to packets from other nodes. Other examples can be used to achieve the same advantage, either based on sending messages selectively, i.e. limiting the rate of sending indications, or by other methods, such as indicating explicitly in the indication, and/or the marking, what is the proportion of the congestion attributable to a given flow, or connection.

At 260, the packet is placed in an appropriate queue in the router. This also takes place if the average queue size is less than the minimum threshold.

The ISQ send process begins at 270 by checking if the CE bit has been set previously. If not, at 280, a congestion level index is derived from the congestion level in the router, obtained by the RED process from the size of the queues. At 290 the packet source address is obtained, and the ISQ generated using the packet source address and the congestion level index. There is an unused 32 bit field in the ISQ which can be used for the level index. It is sent back to the IP source, and the process returns at 310.

If the CE bit has been set previously, at 320, it is determined if the packet has been dropped by the RED process. If not, the process returns. Otherwise, the congestion level index is set at a maximum, eight in this case, and the ISQ is generated and sent on the basis of this index and the packet source address. This means where there are multiple congested routers in the path, they will be dealt with in order, starting with the one closest to the source. Any bias in this will be mitigated by having an ISQ sent if a second or subsequent congested router discards a packet. This will contribute to the flow control at the source. If more balance is warranted, downstream routers could be allowed to send ISQs in some circumstances when they are not discarding a packet, but they find the CE bit already set.

Figure 6:
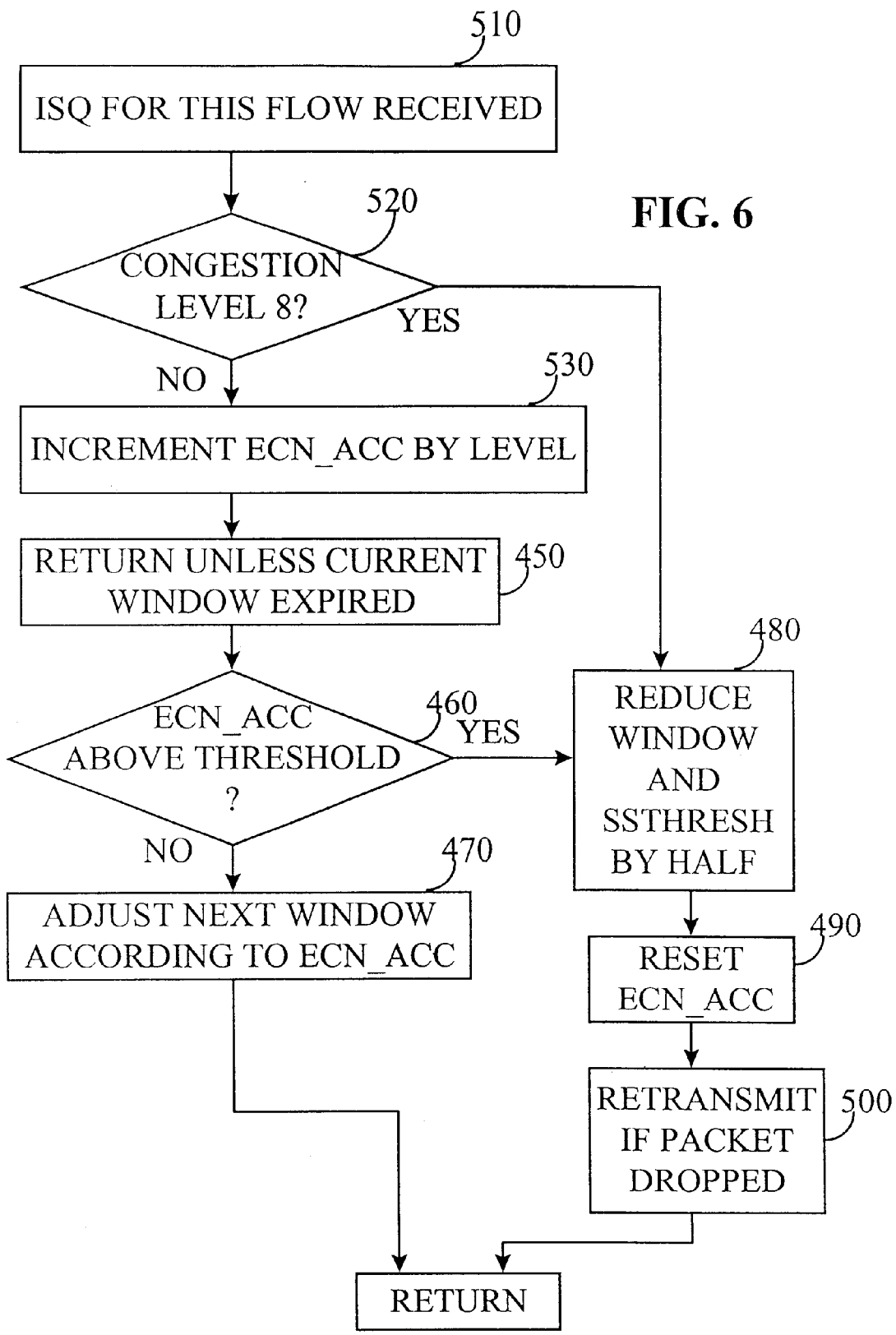
FIG. 6 shows an example of flow control actions of FIG. 4 of a TCP source receiving an ISQ.

FIG. 6—TCP Source Response to ISQ

FIG. 6 shows in more detail the actions of a TCP source in the embodiment of FIG. 4. The TCP source may be arranged to responds to congestion notification from either the intermediate nodes, or from the receiver, or both. In the case of being responsive to both, it could be arranged to respond to either type individually, or be arranged to control a flow on the basis of both types of notification simultaneously. The example of response to ISQs will now be described in more detail.

At 510, an ISQ is received for this flow. Different flows, for each different source-receiver pair, will have their own process. If it is determined at 520 from the ISQ that the congestion level is severe, e.g. level 8 in this example, then a rapid response is made. Otherwise, a more measured, gradual control algorithm is carried out.

The rapid response, 480, involves reducing the window by half and reducing the value of SSTHRESH by half. This value represents a threshold for the TCP slow starting procedure. This defines how the window is increased in size following a slow start, which involves reducing the window to one. At 490, the value of ECN_ACC is reset following this drastic window reduction. If it was caused by a level 8 ISQ, the source infers that the packet was dropped, and retransmitted at 500.

The example of the more gradual response involves incrementing a counter ECN_ACC, by the level of the congestion, 530. The counter reflects the number and severity of the congestion notifications received over a time period for a given flow. The flow is controlled by adjusting the window size. The window size indicates how many packets can be sent before the source must wait for an acknowledgment from the receiver. The source is constrained not to change the window size before the end of the current window, to meet standards, and ensure compatibility with receivers. Hence the counter may be incremented by numerous ISQs from successive packets, before the end of the window. The process returns at 450 to await the end of the window. The counter need only be compared, 460, to a threshold, at the end of the window. If the value of ECN_ACC is below the threshold, at 470 the window is adjusted less drastically, depending on the value of ECN_ACC.

Exactly how the window is adjusted is a matter for particular implementations. It could be incremented by one if the value of ECN_ACC is less than four (<4) but greater than zero (>0). If less than zero (<0), the window could be exponentially incremented. If between four and eight, the congestion window might be left unaltered. If greater than or equal to eight (> or =8) the more drastic congestion reaction at 480 mentioned above, to cut the window and the value of SSTHRESH by half would be carried out.

In another example, the source could react as described above in relation to FIG. 3, and react immediately to an incoming notification, without accumulating a score. This could be appropriate if the ISQ notification is implemented without the level of congestion indication, but with the selective sending of ISQs for a proportion of the packets, and with the preliminary check of the CE bit.

Figure 7:
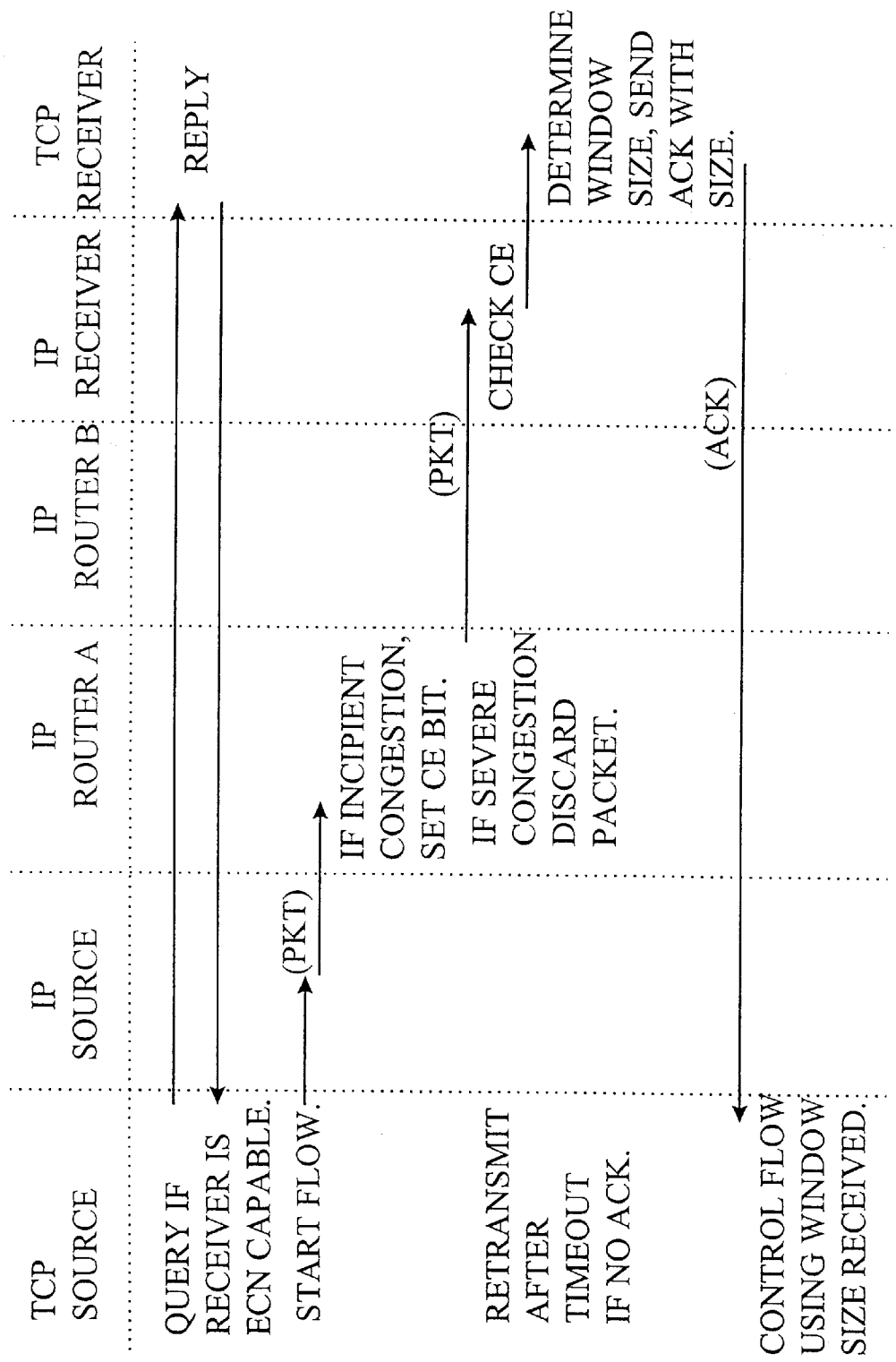
FIG. 7 shows in sequence chart form the actions of elements in a TCP/IP network corresponding to that shown in FIG. 1, according to another embodiment of the invention showing determining window size at the receiver.

FIG. 7—Embodiment Using Receiver Based Flow Control

FIG. 7 shows actions in a similar manner to the diagram of FIG. 4. There are two significant distinctions. Firstly, the TCP receiver, instead of sending an ACK with the ECN bit set, instead determines an offered window size and sends this with the ACK. Secondly, at the TCP source, instead of determining a revised window size on the basis of ECN notify bits in the ACK packets, instead takes the offered window size from the ACK signal, and uses that. The hardware or software in the IP receiver which is arranged to check the CE bit in the IP packet header, is an example of a packet reading means for determining if the packet has been marked by any of the nodes through which it passed, to indicate congestion at that node. The hardware or software in the TCP receiver, or invoked by the TCP receiver, is an example of a packet flow control parameter generator responsive to the packet reading means, for determining a packet flow control parameter.

The offered window size is one example of a parameter for controlling the flow. Others can be conceived. Doing the window size calculation at the receiver has a number of benefits. Firstly, there will be a faster response, because the source need not wait for all ACKs, before being able to determine accurately whether the proportion which have the ECN notify bit set is sufficient to change the window size. Secondly, redundancy is built in because many ACKs will be sent with a calculated window size. Thirdly, the accuracy of the calculation of the window size is not dependent on successful transmission of all the ACKs.

The benefit of faster response can be illustrated by an example of a worst-case scenario. If a group of ACKs are delayed by varying amounts so that some arrive at the source near the end of a window and others arrive later, if the source makes the window calculation, as in the prior art, it may determine that the next window be unaltered or larger, as only a few ACKs with ECN notify bits have arrived in time. In contrast, if the receiver makes the calculation, as soon as enough packets have arrived at the receiver with their CE bit set, thereafter all ACKs issued by the receiver will contain the reduced offered window size. These will be subject to varying delays in their path back to the TCP source. However, the fastest of them will trigger the window reduction at the TCP source. If the fastest one arrives before the end of the previous window, then the next window will be reduced in size, and thereby the amount of congestion reduced. This shows how receiver-based window calculations may give a faster response than simply sending back ECN notify bits and allowing the TCP source to make the window size calculation.

Figure 8:
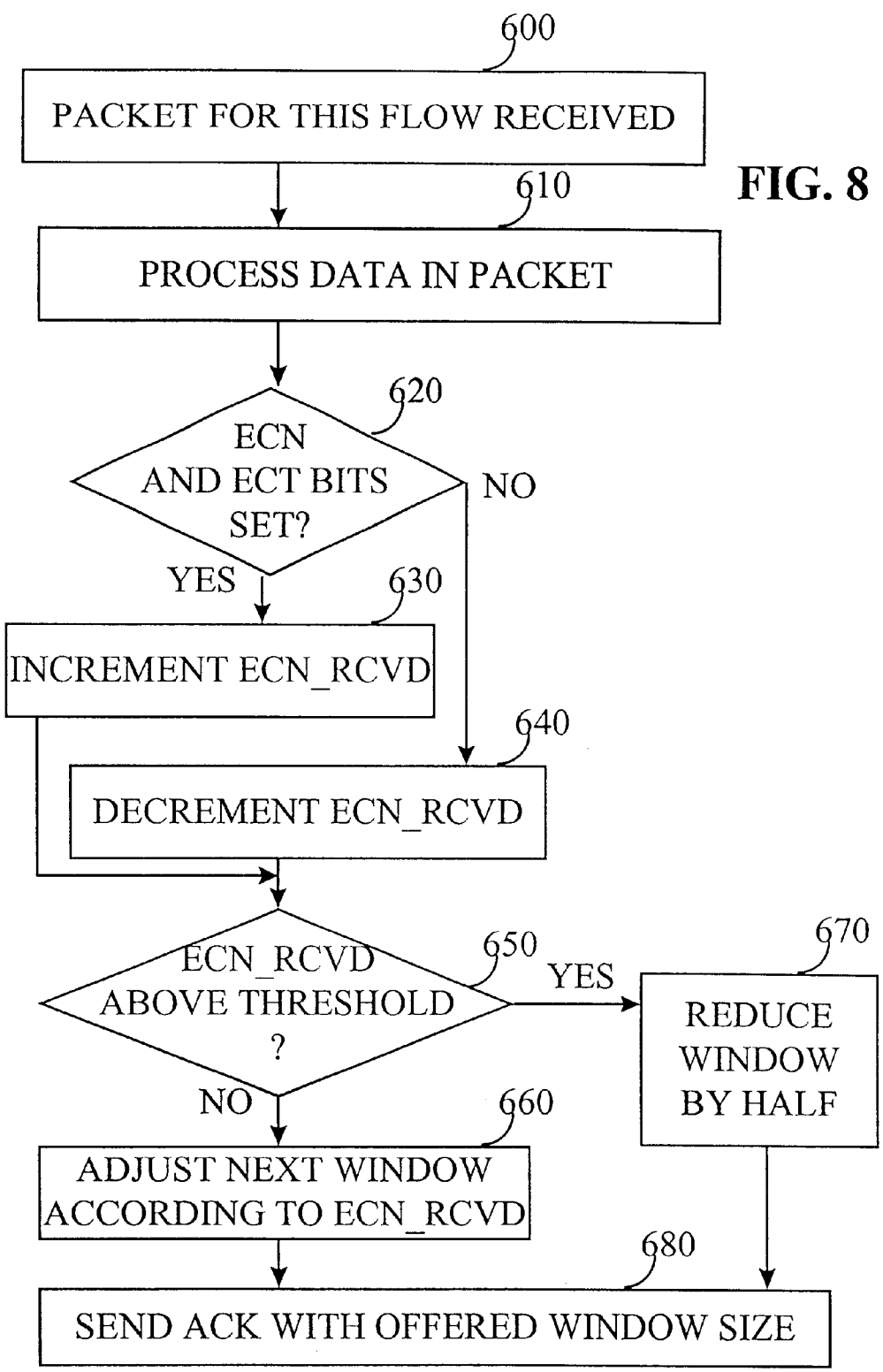
FIG. 8 shows an example of flow control actions of FIG. 7 of the TCP receiver.

FIG. 8—Receiver Actions in the Example of FIG. 7

FIG. 8 shows in more detail the actions of the receiver in response to the arrival packets, according to the example of FIG. 7. When a packet is received, at 600, the flow is identified, from the source address field. At 610, the data in the packet is processed. Simultaneously or afterwards, at 620, there is a test for whether the packet has experienced congestion, as indicated by the ECN and ECT bits in the IP packet. If so, at 630, the value of ECN.RCVD, is incremented. This indicates an accumulation of how many packets have experienced congestion. Otherwise, if the packet has not experienced congestion, at 640, the same value is decremented.

In either case, the value of ECN.RCVD is tested to see if it is above a given threshold at 650. If so, drastic reduction in window size is made. Otherwise, a gradual alteration in the window size can be made, according to the precise value of ECN.RCVD, at 670.

The new window size is then output as an offered window size in a field in the ACK packet. This is sent to the TCP source, at 680.

Just how the window size or other control parameter is calculated in the receiver need not be specified or limited by a standard. This would enable future enhancements to be carried out without having to alter standards, or raising compatibility problems. The calculation could be carried out as part of a separate software module which could be redefined independently of other modules.

This would make it easier to tailor the calculation to take account of receiver specific parameters. For example, the receiver might have a local policy if it is in a different network domain to the source. Local conditions such as local quality of service policies, or local network characteristics may dictate a different window size calculation algorithm. For example, part of the network may be implemented over wireless connections, or satellite connections, in which case different window sizes and different control of the window size may be appropriate to take account of the different delay characteristics.

Figure 9:
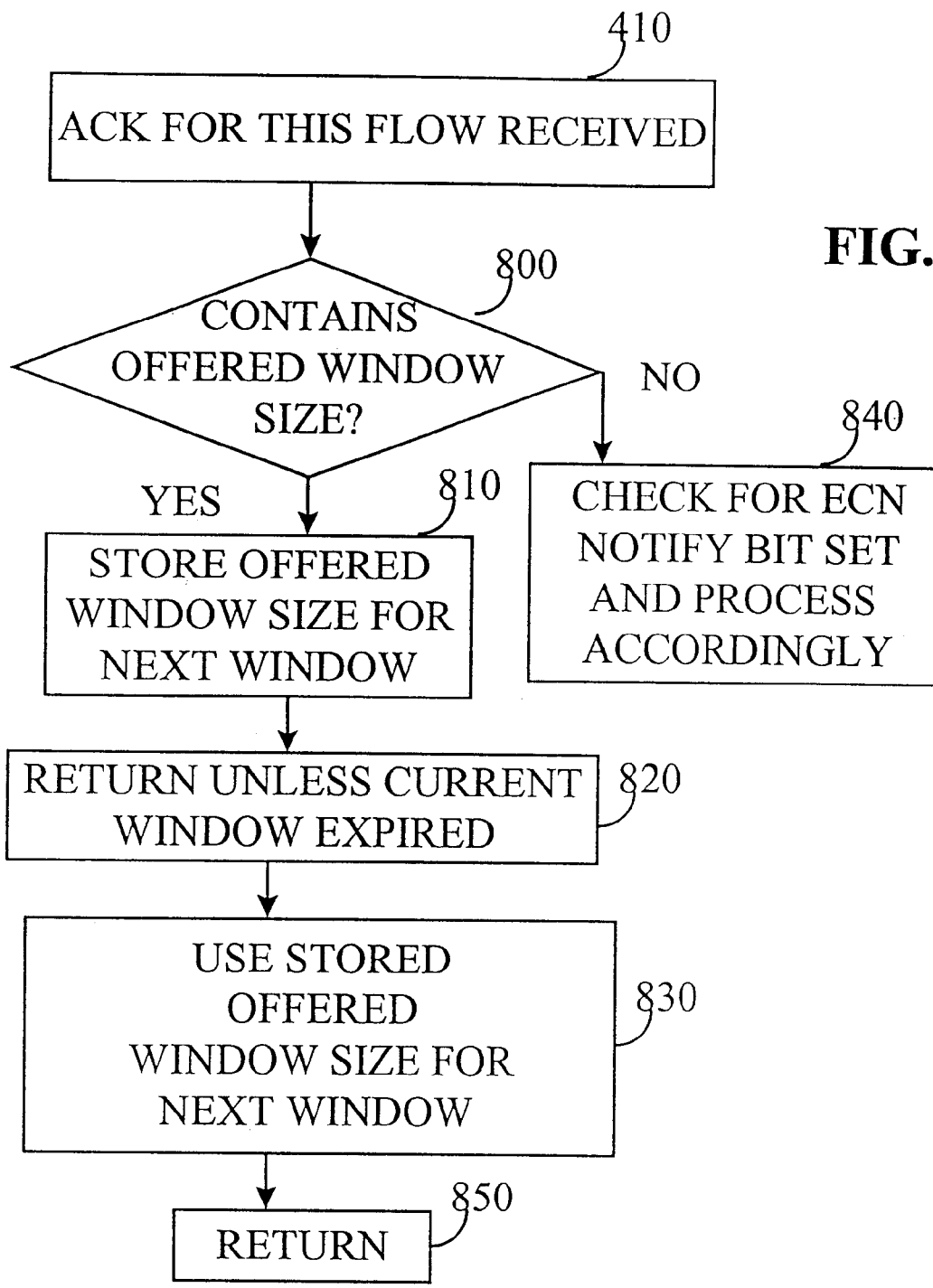
FIG. 9 shows an example of flow control actions of FIG. 7 of the TCP source.

FIG. 9—TCP Source Actions for the Example of FIG. 7

FIG. 9 shows an example of flow control actions of FIG. 7 of the TCP source, where the receiver contributes to the flow control. At 410, an ACK is received by the source, for the given flow. Again different flows would have their own processes, windows and counters as appropriate. At 800, it is determined if the ACK contains a new offered window size, in the appropriate field in the ACK packet. If not, at 840, the source may check for an ECN notify bit, and process it as described in more detail below with reference to FIG. 1.

If there is an offered window from the receiver, this is stored for use at the end of the current window, at 810. At 820, the process returns to await more ACKs, until the end of the current window. Then at 830, the stored offered window is used for the new window. It would be possible to calculate a source window and take the smaller of the source calculated and receiver calculated window sizes, if it is desired to share the influence on the flow control between the source and the receiver.

Where a number of offered windows of different sizes are sent back by the receiver, the source could choose the smallest, or some other selection algorithm could be implemented.

Figure 10:
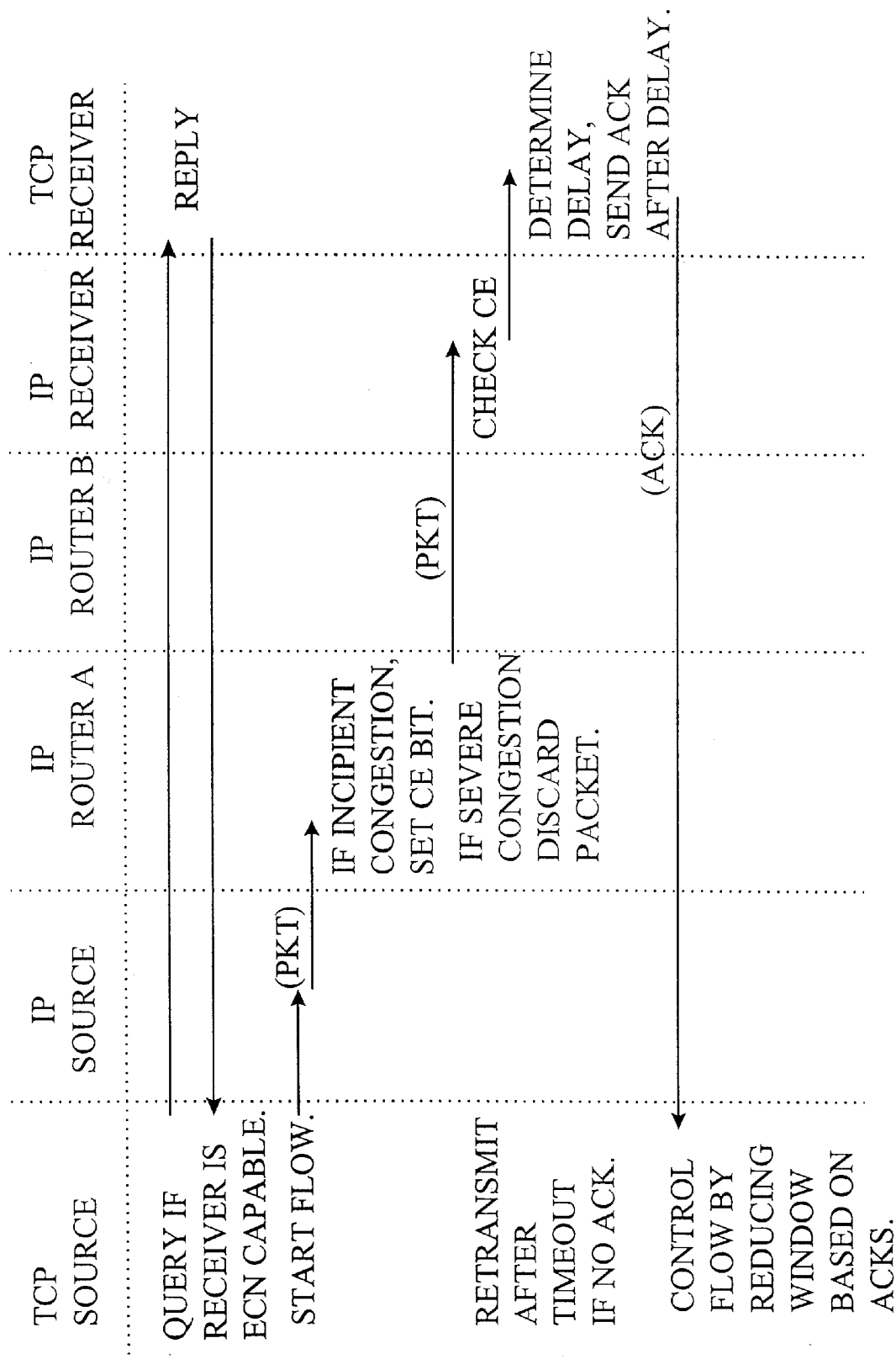
FIG. 10 shows in sequence chart form the actions of elements in a TCP/IP network corresponding to that shown in FIG. 1, according to another embodiment of the invention showing delaying ACK at the receiver.

FIG. 10, Alternative Embodiment Using Receiver Based Flow Control

FIG. 10 shows in sequence chart form the actions of elements in a TCP/IP network corresponding to that shown in FIG. 1, according to another embodiment showing flow control by delaying ACK at the receiver. This shows how the IP receiver may check the CE bit as in the example shown in FIG. 7, but the actions of the TCP receiver and TCP source differ from that example. Instead of adding a window size to the ACK, or setting the ECN notify bit, as in FIG. 3, the TCP receiver determines a delay for the ACK, based on the congestion indications from the current packet, and from preceding packets. The ACK is sent after the delay, and the TCP source reacts accordingly.

The TCP source reacts to delayed ACKs by assuming that the delays are being caused by congestion, and so reduces its flow rate by reducing the window size. As it does not rely on the source processing any ECN bits, this has the advantage that it can be used with non ECN capable sources, and needs no ECN negotiation when setting up a flow. Furthermore, there is no reliance on particular fields in a TCP packet header, so in principle it can be used with other layer four protocols running over IP. The receiver could be arranged to set the ECN notify bit as well, for the source to use if it is ECN capable, since these may enable the receiver to control the flow more accurately, since they will make the source response less dependent on any transit delays for the ACKs.

Figure 11:
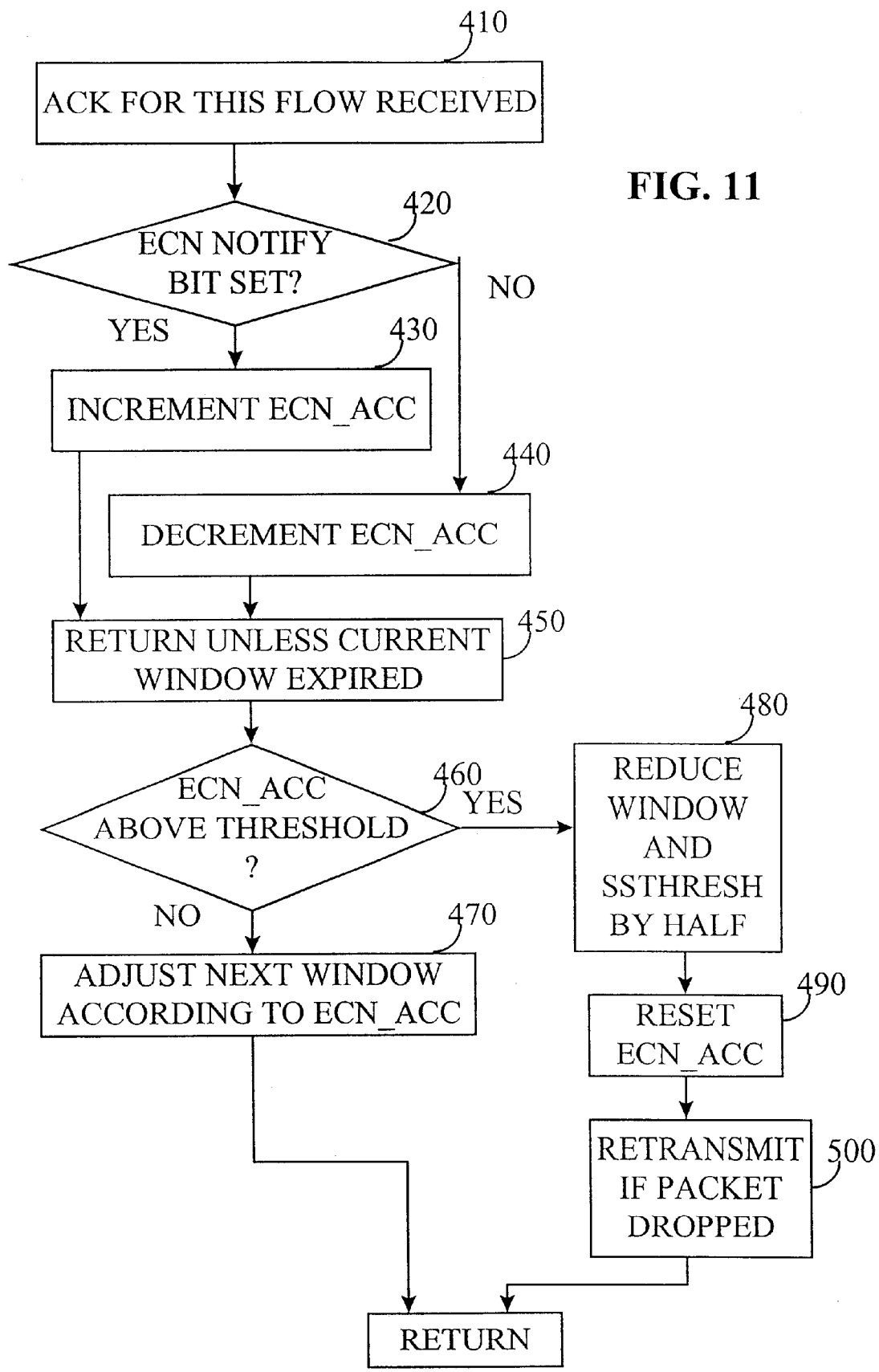
FIG. 11 shows an example of flow control actions of FIG. 4, 7 or 10 of a TCP source receiving an ACK with the ECN notify bit set.

FIG. 11,—Alternative TCP Source Actions for the Example of FIG. 4,7 or 10

FIG. 11 shows an example of flow control actions of FIG. 4,7 or 10 of a TCP source receiving an ACK with the ECN notify bit set. This response may be arranged to occur in conjunction with or as an alternative to flow control based on other inputs. If an ACK is received at 410, the TCP source determines at 420 if the EC notify bit has been set. If so, an accumulating count of congestion notifications, labelled ECN_ACC is incremented at 430. Otherwise, at 440, if an ACK is received without the EC notify bit being set, the value of ECN_ACC is decremented at 440. The process returns at 450 to await the end of the window. At the end of the window, the window adjustment may be made in the same way as described in relation to FIG. 6, reference numerals 460–500. By accumulating a score of congestion notifications, instead of reacting to the first notification in each window, as described with respect to FIG. 3, better control can be achieved. For example transient congestion once per window may not merit reducing the window size.

Hardware Examples

In principle, the source, receiver, router, and other elements described above, could be implemented on a wide range of different types of well known hardware. If speed of operation or capacity are not overriding factors, the OSI layer 3 and 4 functions could be implemented as software processes on a general purpose workstation. Dedicated hardware could be used for specific functions to improve speed, as would be well known. Protocol specific hardware such as linecards, and physical transmission links between remote computers would be used for lower OSI layer functions. The choices are matters of implementation following established principles, and need not be described further here.

Other Variations

Although in the embodiments described, TCP is used, other similar OSI layer four protocols may be used. Likewise, although examples have been described using IP, other OSI layer three protocols may be used as appropriate. The intermediate nodes have been described using the example of a router, though this should not be read as excluding other intermediate nodes where congestion could occur.

Other variations within the scope of the claims will be apparent to persons of average skill in the art, and are not intended to be excluded.

What is claimed is:

1. Packet routing apparatus for routing packets in a network comprising a source node, a receiver node, and other nodes, the routing apparatus comprising:

input means for receiving a packet passed across the network from the source node;

a congestion monitor for determining a degree of congestion at the routing apparatus; and output means coupled to the input means and to the congestion monitor, for sending an indication of this degree of congestion to the source node, using an OSI network layer protocol, wherein the indication to the source is made proportional to how much the packets from the source contribute to the congestion, relative to packets from other nodes, wherein the network layer protocol being used is the Internet Control Message Protocol Source Quench message.

2. Packet routing apparatus for routing packets in a network comprising a source node, and a receiver node, and other nodes, the routing apparatus comprising:

input means for receiving a packet passed across the network from the source node;

a congestion monitor for determining a degree of congestion at the routing apparatus; and output means coupled to the input means and to the congestion monitor, for sending an indication of this degree of congestion to the source node, using an OSI network layer protocol, wherein the indication to the source is made proportional to how much the packets from the source contribute to the congestion, relative to packets from other nodes.

3. The routing apparatus of claim 2 the network layer protocol being an Internet Protocol.

4. The routing apparatus of claim 2 further comprising an output rate adapter for making the indication proportional by adapting the rate of sending indications.

5. The routing apparatus of claim 2, further comprising a packet queue, the congestion monitor being arranged to operate according to how full is the packet queue.

6. The routing apparatus of claim 2, further comprising a packet marker means for marking the packet to indicate it has experienced congestion.

7. Packet routing apparatus for routing packets in a network comprising a source node, and a receiver node, and other nodes, the routing apparatus comprising:

input means for receiving a packet passed across the network from the source node;

a congestion monitor for determining a degree of congestion at the routing apparatus; and output means coupled to the input means and to the congestion monitor, for sending an indication of this degree of congestion to the source node, using an OSI network layer protocol, further comprising means for determining from the packet, if it has previously triggered a sending, to the source node, of an indication of congestion, the output means being operable according to whether such an indication had been sent previously.

8. A source apparatus for use in a packet network comprising a plurality of nodes, the apparatus comprising:

output means for sending a packet via an intermediate one of the nodes in the network to a receiving one of the nodes;

input means for receiving from the intermediate one of the nodes an indication of a degree of congestion at that intermediate one, sent using an Internet Control Message Protocol Source Quench message, in response to the packet; and a controller for controlling a flow of further packets to the receiving node on the basis of the indication, wherein said indication of a degree of congestion is proportional to how much the packets from said source apparatus contribute to the degree of congestion, relative to packets from other nodes.

9. A method of processing packets in a network comprising a receiver node, a source node and at least one intermediate routing node, the method comprising the steps of: at one of the intermediate routing nodes, receiving a packet passed across the network;

determining a degree of congestion at the routing node; and sending an indication of this degree of congestion to the source node, using an Internet Control Message Protocol Source Quench message, wherein said indication of this degree of congestion is proportional to how much the packets from said source node contribute to the degree of congestion at the routing node, relative to packets from other nodes.

10. The method of claim 9, further comprising the step of, at the source node:

receiving from the intermediate routing node the indication of the degree of congestion; and controlling a flow of further packets to the receiving node on the basis of the indication.

11. A method of processing packets in a network comprising a receiver node, a source node and at least one intermediate routing node, the method comprising the steps of, at the source node:

sending a packet to the receiver node;

receiving from the intermediate routing node an indication of a degree of congestion at that intermediate routing node, sent using an Internet Control Message Protocol Source Quench message in response to the packet; and controlling a flow of further packets to the receiving node on the basis of the indication, wherein said indication of a degree of congestion is proportional to how much the packets from said source node contribute to the degree of congestion at that intermediate routing node, relative to packets from other nodes.

12. The method of claim 11, further comprising the step of receiving from the receiver node a flow control message, the step of controlling the flow of further packets being made also on the basis of this flow control message.

13. Packet routing apparatus for routing packets in a network comprising a plurality of nodes, the routing apparatus comprising:

an input for receiving a packet passed across the network;

a congestion monitor for determining congestion in the routing apparatus;

a packet reader for determining from the packet, if it has previously triggered a sending, to the source node, of an indication of congestion at another of the intermediate routing nodes; and an output for sending an indication of congestion to the source node according to whether such an indication had been sent previously.

14. A method of processing packets in a network comprising a receiver node, a source node and at least one intermediate routing node, the method comprising the steps of, at one of the intermediate routing nodes:

receiving a packet passed across the network;

determining congestion in the routing apparatus;

determining from the packet, if it has previously triggered a sending, to the source node, of an indication of congestion at another of the intermediate routing nodes; and sending an indication of the congestion to the source node according to whether such an indication had been sent previously.

15. The method of claim 14, the packet being an Internet Protocol packet, and the step of determining from the packet, if it has previously triggered a sending of an indication comprising checking the Congestion Experienced bit in the packet header.

16. The method of claim 14, the step of sending an indication not being carried out if the indication had been sent previously, unless the routing apparatus discards the packet.

17. A method of using an application to transmit data across a network, the application comprising processing packets in a network comprising a receiver node, a source node and at least one intermediate routing node, the method comprising the steps of: at one of the intermediate routing nodes, receiving a packet passed across the network;

determining a degree of congestion at the routing node; and sending an indication of this degree of congestion to the source node, using an Internet Control Message Protocol Source Quench message, wherein said indication of this degree of congestion is proportional to how much the packets from said source node contribute to the degree of congestion at the routing node, relative to packets from other nodes.

18. Software stored on a computer readable medium for carrying out a method of processing packets in a network comprising a receiver node, a source node and at least one intermediate routing node, the method comprising the steps of: at one of the intermediate routing nodes, receiving a packet passed across the network;

determining a degree of congestion at the routing node proportional to how much the packets from the source node contribute to the degree of congestion, relative to packets from other nodes; and sending an indication of this degree of congestion to the source node, using an OSI network layer protocol.

19. Packet routing apparatus for routing packets in a network comprising a source node, and a receiver node, and other nodes, the routing apparatus comprising:

input means for receiving a packet passed across the network from the source node;

a congestion monitor for determining a degree of congestion at the routing apparatus; and output means coupled to the input means and to the congestion monitor, for sending an indication of this degree of congestion to the source node, using an Internet Control Message Protocol Source Quench message, wherein said indication of this degree of congestion is proportional to how much the packets from said source node contribute to the degree of congestion at the routing apparatus, relative to packets from other nodes.

20. The routing apparatus recited in claim 19 further comprising a packet queue, the congestion monitor being arranged to operate according to how full is the packet queue.

21. The routing apparatus recited in claim 19 further comprising a packet marker means for marking the packet to indicate it has experienced congestion.

* * * * *